UNITED STATES PATENT OFFICE.

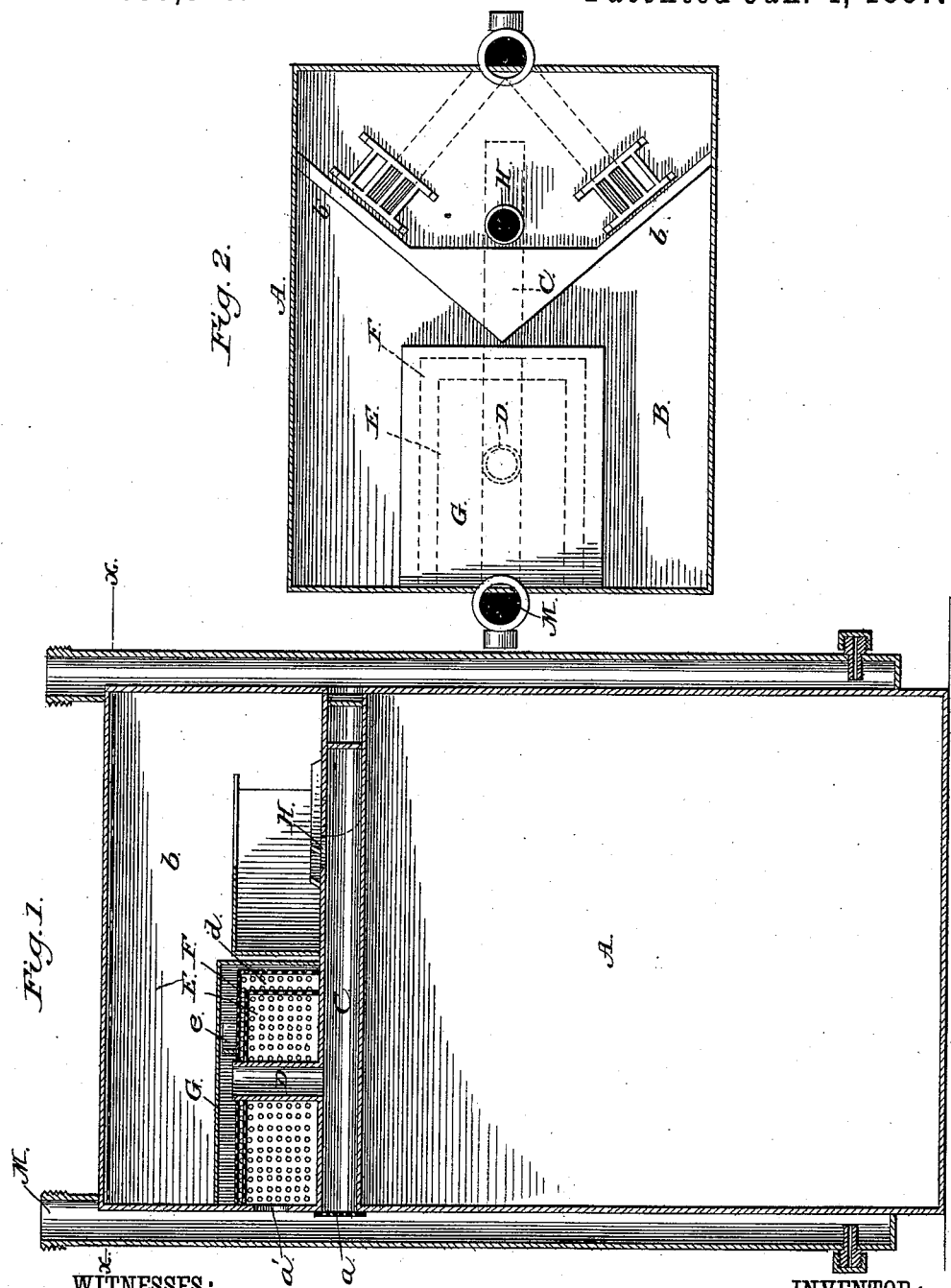

JOHN A. FARDY, OF BROOKLYN, NEW YORK.

GAS-METER.

SPECIFICATION forming part of Letters Patent No. 355,516, dated January 4, 1887.

Application filed September 3, 1886. Serial No. 212,631. (No model.)

*To all whom it may concern:*

Be it known that I, JOHN A. FARDY, of the city of Brooklyn, in the county of Kings and State of New York, have invented a new and useful Improvement in Gas-Meters, of which the following is a full, clear, and exact description.

My invention relates to an improvement in gas-meters, and has for its object to provide a filter within the meter to extract foreign matter from the gas as it enters and to confine the deposit thus obtained to a given space, whereby the valves and diaphragm are left clean and free to act, and a more steady light therefore attained.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in both the figures.

Figure 1 is a central vertical section through a meter containing my improvement, and Fig. 2 a horizontal section thereof through line $x\ x$ of Fig. 1.

All gas supplied to meters is impregnated with more or less foreign matter, which in the passage of the gas through the valves of the meter forms a coating or deposit thereon, causing the gas as supplied to the burners to give a flickering or unsteady light. This deposit also finds its way into the diaphragms, interfering thereby with the proper registration of the meter. I aim through my invention to control this deposit in meters, and to that end I cause the regular gas-inlet aperture $a$ of the meter A to be stopped. This is usually accomplished by packing the same with cotton, linen, or other equivalent material, and soldering over the outer side thereof a metal cap, either solid or perforated, and providing instead another inlet-aperture, $a'$, slightly above and in line with the said closed aperture $a$.

The gas-inlet aperture $a'$, located as above, enters the meter in that division B of the upper compartment, $b$, thereof which is at present not utilized. Centrally within the said division B, I make connection with the regular gas-conducting pipe C of the meter by means of a stand-pipe, D, and enter over said stand-pipe a filter, E, consisting of a perforated metal box having one side and the bottom open, preferably made rectangular in form, and provided with an aperture in the top thereof to receive the stand-pipe D.

A second filter, F, larger than the aforesaid filter E, but of the same construction and form, is now placed over the inner filter, E, the stand-pipe D of the meter projecting up through its top aperture. A space, $d$, is thus formed upon four sides, between the said filters E and F—namely, between the tops, the rear ends, and the two sides—the bottom edges thereof being attached to the floor of the compartment $b$ and the edges of their front open ends to the side of the meter around the gas-inlet opening $a'$. A top projecting strip, $e$, is provided on the outer filter, F, whereby it is lifted out to be cleaned, as hereinafter described.

The filters, positioned as above, are covered by a spaced metal casing, G, securely attached to the floor of the upper compartment, $b$, and the side of the meter A in which the inlet-aperture $a'$ is located.

If found necessary, strips of cotton, linen, or any filtering material may be placed between the said metal filters E and F and between them and the top of the casing G as an additional means of purifying the gas.

In the operation of my improvement the gas entering through the inlet-aperture $a'$ passes up through the filters E and F and through the interposed strips of cotton or linen, if used, up against the top of the casing G, thence down the stand-pipe D to the regular conducting-tube C, and then up through the aperture H and over the valves in the ordinary manner.

In the passage of the gas through the filters the foreign matter is extracted to a great extent and the gas sent comparatively pure to the burner, the deposit being retained within the casing G.

The deposit is removed from the meter in the ordinary way by disconnecting the meter and tilting the same, whereupon the fluid is allowed to escape through the side supply-pipe, M. When it is desired to clean the filter, the top of the casing G is removed and the filters, which are but slightly attached, taken out.

Having thus described my invention, what I claim as new, and desire to secure by Letters Patent, is—

1. In a gas-meter, the combination, with the supply-pipe C, provided with a stand-pipe, D, of the perforated metallic boxes E and F, together with a metallic incasing-box, G, and gas-inlet $a'$, substantially as shown and described, and for the purpose herein set forth.

2. In a gas-meter, the combination, with the supply-pipe C, provided with a stand-pipe, D, of the inner perforated metal box, E, having an open end and bottom and an upper central aperture, the outer spaced perforated metal box, F, provided with an open end and bottom, a central top aperture, and a handle, $e$, together with the metallic casing G and inlet $a'$, substantially as shown and described, and for the purpose herein set forth.

JOHN A. FARDY.

Witnesses:
J. F. ACKER, Jr.,
EDWD. M. CLARK.